(12) United States Patent
Yokoyama

(10) Patent No.: US 6,866,441 B2
(45) Date of Patent: Mar. 15, 2005

(54) BALL JOINT

(75) Inventor: Tokuji Yokoyama, Aichi (JP)

(73) Assignee: Musashi Seimitsu Industry Co., Ltd., Aichi (JP)

( * ) Notice: Subject to any disclaimer, the term of this patent is extended or adjusted under 35 U.S.C. 154(b) by 0 days.

(21) Appl. No.: 10/329,580

(22) Filed: Dec. 27, 2002

(65) Prior Publication Data
US 2003/0156895 A1 Aug. 21, 2003

(30) Foreign Application Priority Data
Feb. 21, 2002 (JP) ........................................ 2002-044523

(51) Int. Cl.$^7$ .............................. F16C 11/06; F16J 15/52
(52) U.S. Cl. ......................... 403/50; 403/51; 403/122; 403/132; 403/133; 403/135; 403/140
(58) Field of Search ............................. 403/50, 51, 56, 403/76, 90, 114, 115, 122, 132, 133, 135, 140; 277/634–636

(56) References Cited
U.S. PATENT DOCUMENTS
3,381,987 A * 5/1968 Husen ........................ 403/51

FOREIGN PATENT DOCUMENTS
JP 11-63245 3/1999

* cited by examiner

Primary Examiner—Daniel P. Stodola
Assistant Examiner—Victor MacArthur
(74) Attorney, Agent, or Firm—Arent Fox, PLLC

(57) ABSTRACT

In a ball joint including a retaining ring to which a boot is mounted and which is press-fitted to a ball stud, the ball stud is formed with a press-fit portion to which a cylindrical portion of the retaining ring is press-fitted, and an annular projection having a tapered forming face rising with an up-grade from a press-fit terminal end of the press-fit portion. When the cylindrical portion is press-fitted to the press-fit portion, a particular cylindrical portion set at a tip end of the cylindrical portion is expanded by pressing the particular cylindrical portion against the tapered forming face, thereby forming a small flange. Thus, the small flange of the retaining ring can be simultaneously formed utilizing a force of press-fitting of the cylindrical portion of the retaining ring to the ball stud. This can contribute to a reduction in the number of assembling steps.

6 Claims, 4 Drawing Sheets

TENSILE FORCE

BALL JOINT

BACKGROUND OF THE INVENTION

1. Field of the Invention

The present invention relates to a ball joint used at an oscillating portion of a suspension of an automobile, and particularly to an improvement in a ball joint comprising a ball stud, a ball socket for swingably retaining a ball-shaped head of the ball stud with a bearing interposed therebetween, a retaining ring having a cylindrical portion press-fitted to an outer peripheral surface of a shank and a pair of large and small flanges protruding from axially outer and inner ends of the cylindrical portion, and a boot having first and second annular beads fitted to the retaining ring and the ball socket, respectively, the first mounting bead being formed with an inner periphery seal portion and an end face seal portion which are adapted to come into close contact with the cylindrical portion and the large flange, respectively.

2. Description of the Related Art

Such a ball joint is already known, for example, as disclosed in Japanese Patent Application Laid-open No. 11-63245.

To form the retaining ring in such a conventional ball joint, the first mounting bead of the boot is first fitted to the cylindrical portion of the retaining ring whose small flange is not yet formed, i.e., the retaining ring having only the large flange formed at one end of the cylindrical portion; and the small flange is then formed by expanding a particular cylindrical portion set at a tip end of the cylindrical portion of the retaining ring from the side of the second mounting bead by an expanding jig for forming the small flange. Thereafter, the shank of the ball stud is press-fitted to the cylindrical portion of the retaining ring.

However, the formation of the small flange of the retaining ring by the special expanding jig after fitting the first mounting bead of the boot to the cylindrical portion of the retaining ring as in the conventional ball joint, results in an increase in the number of steps of assembling the ball joint, which is an obstacle to a reduction in cost.

SUMMARY OF THE INVENTION

Accordingly, it is an object of the present invention to provide a ball joint of the above-described type, wherein when the retaining ring is press-fitted to the shank of the ball stud before the formation of the small flange in the retaining ring, the small flange can be formed simultaneously utilizing such a press-fitting force, thereby providing a decrease in the number of assembling steps, and in turn a reduction in cost.

To achieve the above object, according to a first feature of the present invention, there is provided a ball joint comprising a ball stud, a ball socket for swingably retaining a ball-shaped head of the ball stud with a bearing interposed therebetween, a retaining ring having a cylindrical portion press-fitted to an outer peripheral surface of a shank and a pair of large and small flanges protruding from axially outer and inner ends of the cylindrical portion, and a boot having first and second annular beads fitted to the retaining ring and the ball socket, respectively, the first mounting bead being formed with an inner periphery seal portion and an end face seal portion which are adapted to come into close contact with the cylindrical portion and the large flange, respectively, wherein the shank is formed with a press-fit portion to which the cylindrical portion is press-fitted, and an annular projection having a tapered forming face rising with an up-grade from a press-fit terminal end of the press-fit portion, and when the cylindrical portion is press-fitted to the press-fit portion, a particular cylindrical portion set at a tip end of the cylindrical portion is expanded by pressing the particular cylinder portion against the tapered forming face to form the small flange.

The inner periphery seal portion and the end face seal portion correspond to an inner periphery seal lip 27 and an end face seal lip 26 in an embodiment of the present invention which will be described hereinafter.

With the first feature, when the cylindrical portion of the retaining ring whose small flange is not yet formed, is press-fitted to the press-fit portion of the shank of the ball stud, the particular cylindrical portion set at the tip end of the cylindrical portion is expanded in conformity to the tapered forming face of the annular projection of the shank in such a press-fitting process, whereby the small flange is formed. By simultaneously forming the small flange utilizing the force of press-fitting of the cylindrical portion to the shank in the above manner, a special small-flange forming step is eliminated, leading to a decrease in the number of steps of assembling the ball joint, whereby a reduction in cost can be provided.

According to a second feature of the present invention, in addition to the first feature, the particular cylindrical portion is formed to have a wall thickness smaller than that of the cylindrical portion.

With the second feature, the small flange can be formed relatively easily, but also upon completion of the formation of the small flange, the press-fit resistance is increased due to the abutment of the thicker cylindrical portion against the annular projection of the shank and hence, such a state can be sensed accurately.

The above and other objects, features and advantages of the invention will become apparent from the following description of the preferred embodiment taken in conjunction with the accompanying drawings.

DESCRIPTION OF THE PREFERRED EMBODIMENT

The present invention will now be described by way of a preferred embodiment with reference to the accompanying drawings.

Figure 1A:
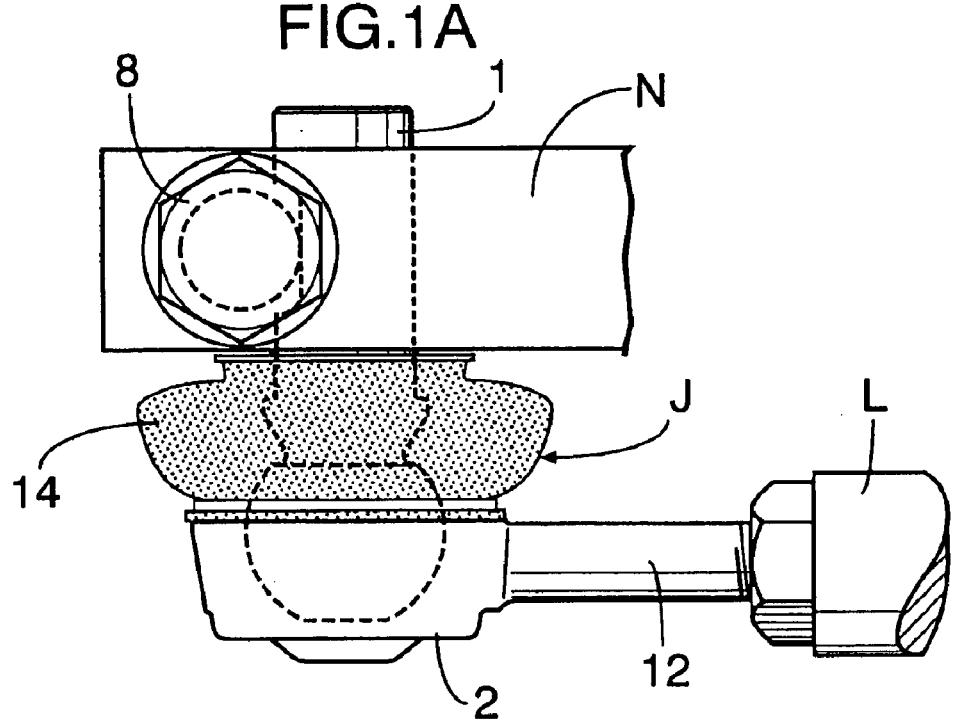
FIGS. 1A and 1B are side views of a section of a suspension of an automobile, which is provided with a ball joint of the present invention.
Figure 1B:
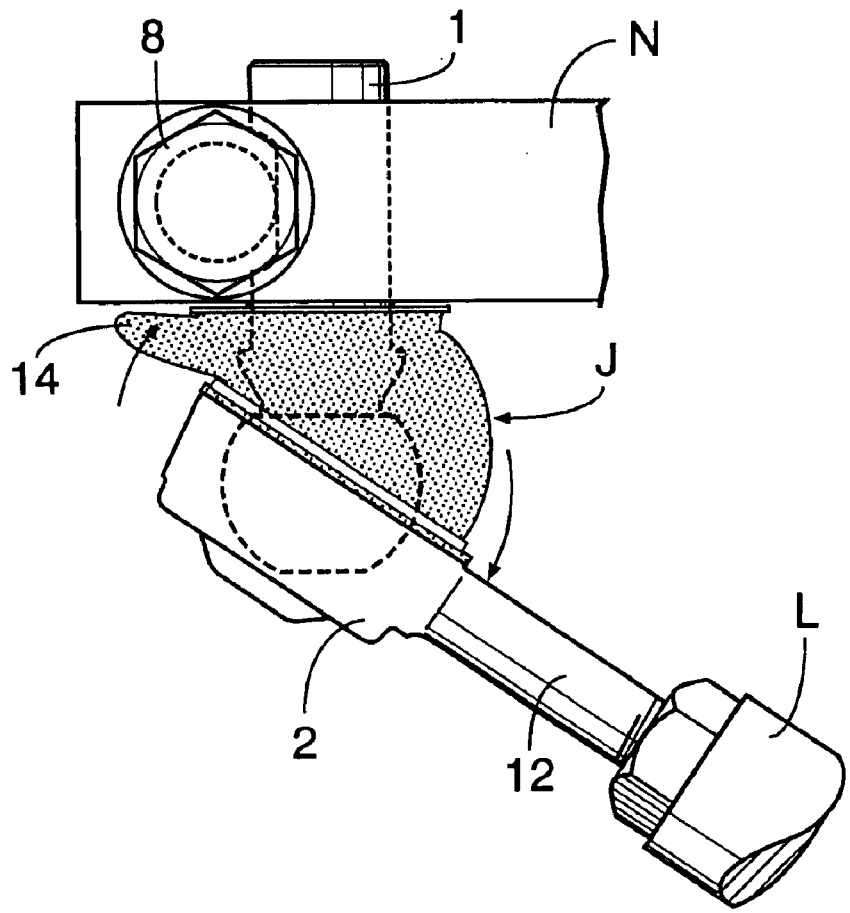

Referring first to FIGS. 1A and 1B, a link L and a knuckle arm N in a suspension of an automobile are connected to each other through a ball joint J according to this embodiment, so that they can be swung relative to each other in response to a vertical movement or turning of a wheel, as shown in FIGS. 1A and 1B.

Figure 2:
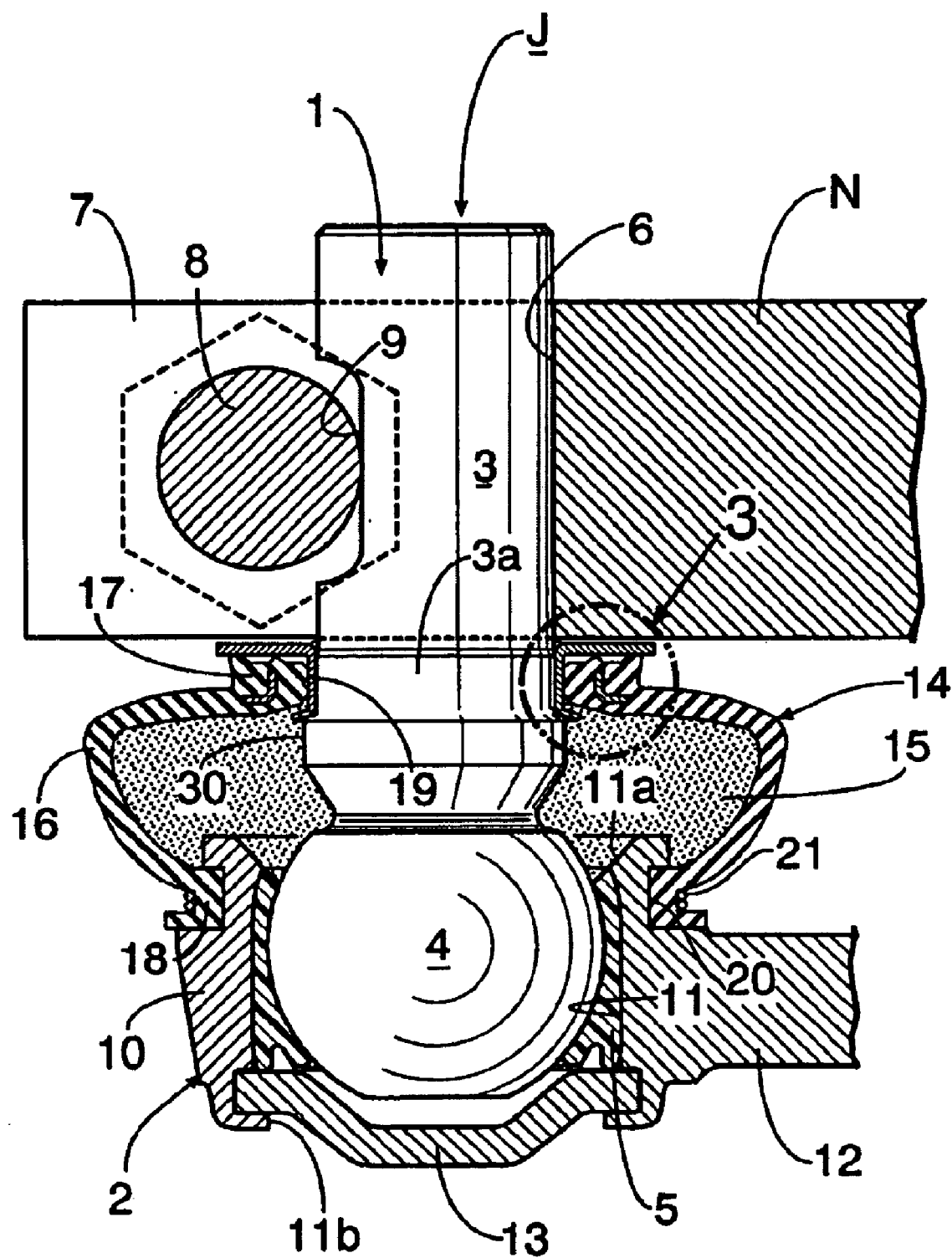
FIG. 2 is a vertical sectional view of the ball joint shown in FIG. 1.
Figure 3:
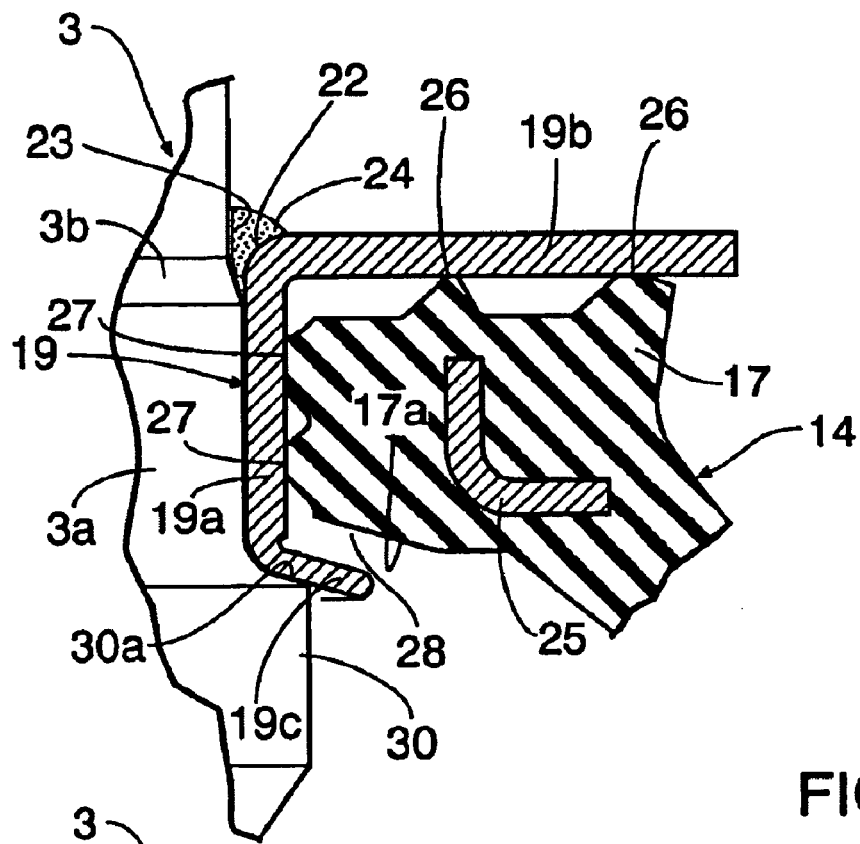
FIG. 3 is an enlarged view of a portion indicated by 3 in FIG. 2.
Figure 4:
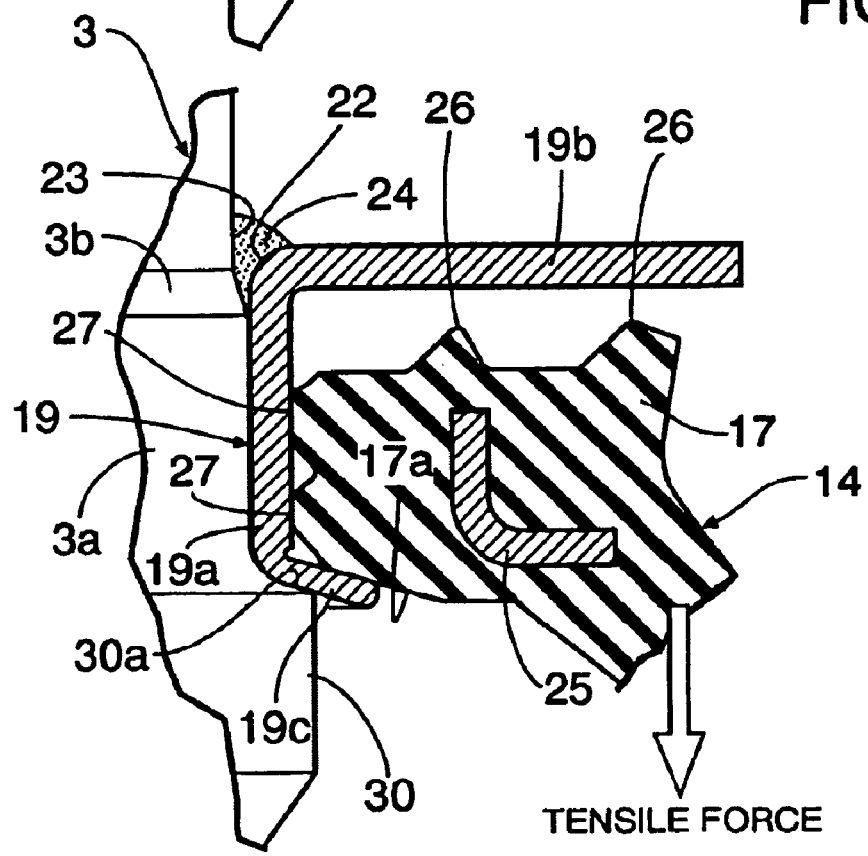
FIG. 4 is a view similar to FIG. 3 for explaining the operation.

As shown in FIGS. 2 and 3, the ball joint J includes a ball stud 1 having a ball-shaped head 4 integrally formed at one end of a shank 3, and a ball socket 2 for retaining the ball-shaped head 4 with a bearing ring 5 interposed therebetween. Then ball stud 1 is fitted in a connecting bore 6 having a slit 7 in the knuckle arm N, and is connected to the knuckle N by tightening the slit 7 by a bolt 8. In this case, one side of the bolt 8 serves as a detent portion for the shank 3 by engagement in a notch 9 defined in one side of the shank 3.

The ball socket 2 comprises a socket body 10 formed with a housing 11 which accommodates the ball-shaped head 4 of the ball stud 1 along with the bearing 5, a connecting arm 12 protruding from one side of the socket body 10, and a cap 13 for closing an opening 11b in the housing 11 opposite from an opening 11a from which the shank 3 of the ball socket 2 protrudes. The connecting arm 12 is connected to the link L.

A boot 14 is spread between the shank 3 and the socket body 10 to seal the opening 11a in the housing 11, and an appropriate amount of grease 15 for lubricating the periphery of the ball-shaped head is filled within the boot 14.

The boot 14 is made of an elastic material such as rubber and comprises a pouch-shaped boot body 16, and first and second annular mounting beads 17 and 18 integrally formed at opposite ends of the boot body 16. The second mounting bead 18 has a diameter larger than that of the first mounting bead 17. The first mounting bead 17 is mounted to a retaining ring 19 press-fitted and coupled to the shank 3 of the ball stud 1, and the second mounting bead 18 is mounted, as usual in the prior art, in an annular groove 20 defined in an outer periphery of a side end of the opening 11a in the socket body 10, and is tightened by a set ring 21.

The retaining ring 19 is made of a steel pipe and comprises a cylindrical portion 19a, and a pair of large and small flanges 19b and 19c protruding radially from axially opposite ends of the cylindrical portion 19a, respectively. The cylindrical portion 19a is press-fitted and coupled to a press-fit portion 3a of the shank 3 of the ball stud 1, the press-fit portion 3a being exposed from the knuckle arm N toward the ball-shaped head 4 and having a diameter slightly larger than that of another portion, while the large flange 19b is opposed to a side of the knuckle arm N. In this case, a small annular recess 23 is defined between the large flange 19b and the shank 3.

More specifically, the small annular recess 23 is defined between an outer peripheral surface of the shank 3 and a small curved face 22 formed outside a folded portion between the cylindrical portion 19a and the large flange 19b, when the retaining ring 19 is formed by pressing. The small annular recess 23 is also defined between an inner peripheral surface of the large flange 19b and the outer peripheral surface of the shank 3 by bringing an annular step 3b between the press-fit portion 3a of the shank 3 and a smaller-diameter portion provided above the press-fit portion 3a from the large flange 19b toward the cylindrical portion 19a.

A liquid sealing agent 24 is applied to the small annular recess 23. Thus, the sealing agent 24 fills the small annular recess 23 and permeates into a very small clearance left between press-fit faces of the shank 3 and the cylindrical portion 19a by capillary action, and is then solidified.

Figure 5:
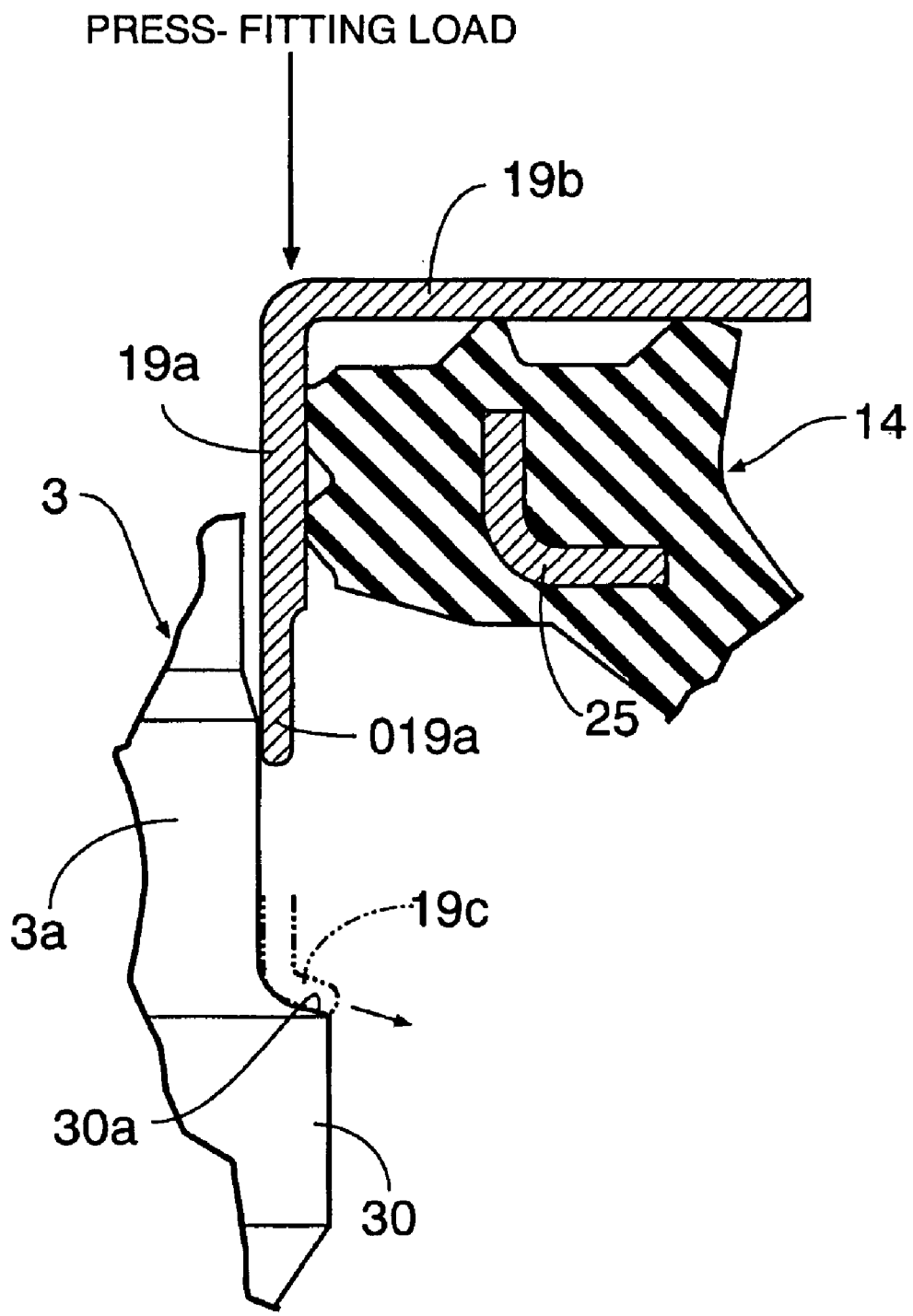
FIG. 5 is a view for explaining a process of press-fitting a retaining ring to a ball stud to form a small flange.

The formation of the small flange 19c of the retaining ring 19 will be described below with reference to FIG. 5.

The shank 3 of the ball stud 1 is formed with an annular projection 30 having a tapered forming face 30a rising with an up-grade from a press-fit terminal end of the press-fit portion 3a. In this case, it is desirable for smooth formation of the small flange 19c that a base portion of the tapered forming face 30a is formed to have a concave curved face continuous to an outer peripheral surface of the press-fit portion 3a, as shown in FIG. 5.

On the other hand, a particular cylindrical portion 019a of the retaining ring is connected to the cylindrical portion 19a of the retaining ring 19 and becomes the small flange 19c at a tip end opposite from the large flange 19b. The particular cylindrical portion 019a has a wall thickness smaller than that of the cylindrical portion 19a.

Prior to the press-fitting of the retaining ring 19 to the shank 3, the first mounting bead 17 of the boot 14 is first fitted to the cylindrical portion 19a of the retaining ring 19. Thereafter, the cylindrical portion 19a is press-fitted to the press-fit portion 3a of the shank 3 with the particular cylindrical portion 019a in the lead. Thereupon, the particular cylindrical portion 019a is pressed against the tapered forming face 30a of the annular projection 30 of the shank 3 in a press-fitting process, whereby it is expanded in conformity to the tapered forming face 30a to become the small flange 19c. Especially, because the diameter of the particular cylindrical portion 019a is smaller than that of the cylindrical portion 19a, such expansion is relatively easy, so that the small flange 19c is formed easily.

Upon completion of the press-fitting of the cylindrical portion 19a to the press-fit portion 3a and the formation of the small flange 19c, the press-fit resistance is suddenly increased by the abutment of the thicker cylindrical portion against the annular projection 30 of the shank 3 and hence, such a state can be sensed accurately.

Referring again to FIG. 3, an annular reinforcing ring 25 is embedded in the first mounting bead 17. A pair of larger and small end face seal lips 26, 26 are formed in a concentric arrangement on an axially outer end face of the first mounting bead 17, and a pair of inner periphery seal lips 27, 27 are formed in an axial arrangement on an inner peripheral surface of the first mounting bead 17. The first mounting bead 17 is mounted to the retaining ring 19 in such a manner that the end face seal lips 26, 26 come into close contact with an inner side of the large flange 19b, and the inner periphery seal lips 27, 27 come into close contact with an outer peripheral surface of the cylindrical portion 19a. The force of close contact of the end face seal lips 26, 26 with the large flange 19b relies on the axially stretching force of the boot body 16, and the force of close contact of the inner periphery seal lips 27, 27 with the cylindrical portion 19a relies on a radial interference provided to the first mounting bead 17.

A predetermined clearance 28 is provided between the small flange 19c and the inner end face 17a of the first mounting bead 17 opposed to the small flange 19c, and adapted to permit the movement of the first mounting bead 17 toward the small flange 19c, when the end face seal lips 26, 26 are in close contact with the large flange 19b. In this case, both the small flange 19c and the inner end face 17a of the first mounting bead 17 opposed to the small flange 19c are formed into tapered shapes such that they are inclined toward the ball-shaped head 4 in a radially outward direction.

The operation of this embodiment will be described below.

In the boot 14 of the ball joint J, the end face seal lips 26, 26 of the first mounting bead 17 are usually retained in close contact with the large flange 19b of the retaining ring 19 by the axial stretching force of the boot body 16 itself, and even when the ball stud 1 and the ball socket 2 are swung relative to each other, as shown in FIGS. 1A and 1B, the boot body 16 is only deformed resiliently, and the close contact of the end face seal lips 26, 26 of the first mounting bead 17 with the large flange 19b is retained. Therefore, it is possible to prevent the entrance of water, mud and sand into the boot 14 by a sealing function of the end face seal lips 26, 26 to the large flange 19b and a sealing function of the inner periphery seal lips 27, 27 to the cylindrical portion 19a.

If mud or snow deposited to the outer peripheral surface of the boot 14 is frozen during parking of the automobile in a cold district, the boot 14 is hardened. If the automobile is started in such a state and the ball stud 1 and the ball socket 2 are swung relative to each other with the starting of the automobile, the first mounting bead 17 is pulled toward the ball-shaped head 4 in a side where the tensile force of the boot is applied. However, because the clearance 28 is provided between the inner end face 17a of the first mounting bead 17 and the small flange 19c of the retaining ring 19, the first mounting bead 17 is moved toward the small flange 19c, while the inner periphery seal lips 27, 27 are slid on the cylindrical portion 19a of the retaining ring 19. Therefore, it is possible to avoid the generation of an excessive stress on the first mounting bead 17 and the boot body 16. If the mud or snow in the frozen state is peeled off from the boot 14 by the slight flexure of the boot body 16 during such movement of the first mounting bead 17, the boot 14 exhibits an intrinsic stretching force to push back the first mounting bead 17 toward the large flange 19b, whereby the end face seal lips 26, 26 can be retained in close contact with large flange 19b.

If the movement of the first mounting bead 17 toward the small flange 19c were excessive, the separation of the first mounting bead 17 from the retaining ring 19 is inhibited by abutment of the inner end face 17a against the small flange 19c. In this case, because the inner end face 17a and the small flange 19c abutting against each other are of such tapered shapes that they are inclined toward the ball-shaped head 4 in the radially outward direction, as described above, a shock upon the abutment can be dispersed radially outwards, whereby the damage to the first mounting bead 17 due to the abutment shock can be prevented. The formation of the inner end face 17a and the small flange 19c into tapered shapes such that they are inclined toward the ball-shaped head 4 in the radially outward direction, ensures that the predetermined clearance 28 can be provided between the inner end face 17a and the small flange 19c without setting of the axial dimension of the cylindrical portion 19a of the retaining ring 19 at a specially large value, thereby avoiding an increase in size of the ball joint J.

When the cylindrical portion 19a is press-fitted to the shank 3, the small flange 19c of the retaining ring 19 is simultaneously formed utilizing a force of such press-fitting. Therefore, a special small-flange forming step is eliminated, leading to a decrease in the number of steps of assembling the ball joint, whereby a reduction in cost can be provided.

Although the embodiments of the present invention have been described in detail, it will be understood that various modifications in design may be made without departing from the spirit and scope of the invention defined in the claims. For example, to fill the very small clearance left between the shank 3 of the ball stud 1 and the cylindrical portion 19a of the retaining ring 19 with the sealing agent 24, the sealing agent may be applied to the press-fit portions prior to the press-fitting.

What is claimed is:

1. A ball joint comprising a ball stud, a ball socket for swingably retaining a ball-shaped head of said ball stud with a bearing interposed therebetween, a retaining ring having a cylindrical portion press-fitted to an outer peripheral surface of a shank and a pair of large and small flanges protruding from axially outer and inner ends of said cylindrical portion, and a boot having first and second annular beads fitted to said retaining ring and said ball socket, respectively, said first mounting bead being formed with an inner periphery seal portion and an end face seal portion which are adapted to come into close contact with said cylindrical portion and said large flange, respectively, wherein said shank is formed with a press-fit portion to which said cylindrical portion is press-fitted, and an annular projection disposed opposite a juncture where said large flange meets said cylindrical portion and having a tapered forming face rising with an up-grade from a press-fit terminal end of said press-fit portion, and when said cylindrical portion is press-fitted to said press-fit portion, a particular cylindrical portion set at a tip end of said cylindrical portion is expanded by pressing the particular cylinder portion against said tapered forming face to form said small flange, wherein said small flange is placed in abutment against the tapered forming face.

2. A ball joint according to claim 1, wherein said particular cylindrical portion is formed to have a wall thickness smaller than that of said cylindrical portion.

3. A ball joint according to claim 1, wherein said inner periphery seal portion of said first mounting bead comprises a pair of inner peripheral seal lips extending away from an inner peripheral surface of said first mounting bead.

4. A ball joint according to claim 1, wherein the pair of inner periphery seal lips are formed in an axial arrangement on said inner peripheral surface of said first mounting bead.

5. A ball join according to claim 1, wherein said end face seal portion of said first mounting bead comprises a pair of end face seal lips extending away from an a axially outer end face of said first mounting bead.

6. A ball joint according to claim 5, wherein said pair of end face seal lips are formed in a concentric arrangement on said axially outer end face of said first mounting bead.

* * * * *